Oct. 8, 1957  B. H. CARLISLE  2,809,305
MAGNETIC AMPLIFIERS AND CONTROL SYSTEMS
Filed March 3, 1955  3 Sheets-Sheet 1

Fig. 1

INVENTOR
BENJAMIN H. CARLISLE
BY Harry P. Canfield
ATTORNEY

Fig. 2

INVENTOR
BENJAMIN H. CARLISLE

United States Patent Office 2,809,305
Patented Oct. 8, 1957

2,809,305

MAGNETIC AMPLIFIERS AND CONTROL SYSTEMS

Benjamin H. Carlisle, South Euclid, Ohio, assignor to The Clark Controller Company, Cleveland, Ohio, a corporation of Ohio Application March 3, 1955, Serial No. 491,900

7 Claims. (Cl. 307—154)

This invention relates in general to electrically operated control means for controlling electric current in a work circuit which contains an electrical work device to be energized by the current to activate or operate it, and de-energized to restore it; and relates particularly to such control means when the work device is of a type that must be activated by abruptly subjecting it to current of a predetermined high amplitude, and restored by abruptly reducing the current to zero, or substantially zero, amplitude.

Control of a work device by current having these characteristics, can be readily effected by prior devices, such as electromagnetic contactors which make and break the current on their contacts; but in many instances such contactors are undesirable, because of high original cost; and because of having mechanically moving parts; and because of being subject to deterioration by wear, and arcing at the contacts, and the consequent necessity of maintenance to insure continuous reliable operation.

According to the present invention the current to the work device is controlled to have the aforesaid characteristics without the disadvantages of contactors and the like, by a device of the magnetic amplifier class, sometimes called a Transductor, having an improved mode of operation.

A Transductor of well known or conventional type comprises in general a pair of main windings on a magnetic core, and in a circuit arrangement comprising rectifiers, by which the main windings when connected to alternating current supply mains, alternately pass, respectively, half waves of current therethrough to a load circuit, as un-directional pulsating current.

The reactance of the main windings normally has a high value so that small output current flows through them to the work circuit.

Control windings are sometimes employed on the cores, that increase said reactance and decrease the normal output current to a still lower value.

Control windings are usually provided on the core which when energized more or less are capable of reducing the said reactance and therefore can raise the output current to a higher value or reduce it again to a lower value, in accordance with the variable degree of energization thereof.

The Transductor utilized in the present invention is a dual Transductor, or, one in two parts; a principal part and an auxiliary part.

The parts each have main windings and control windings on respective cores, and the control windings of the two parts are interconnected.

The energization of the windings is controlled by control switches. The arrangement of the winding circuits is such that if a first control switch is open, then intermittent closing and opening, respectively, of a second control switch, will cause potential of high value and zero value respectively to be supplied to a work circuit connected to the principal amplifier part; but if the first switch is closed and held closed at the same time, then the said supplied potential upon closing and opening of the second control switch, will be at a very low value and at zero value respectively.

Also if the second control switch is closed and held closed, then intermittent closing and opening respectively of the first switch will cause potential of a very low value and high value respectively to be supplied to the work circuit from the principal part.

Also, if both control switches are closed the supplied potential will be at a very low value.

Potential of high value may also be supplied to the work circuit by momentarily operating and restoring a control switch, and subsequently caused to fall to a low value by then momentarily operating and restoring another control switch.

The Transductor of the invention will thus supply to a work device in the work circuit, current having the aforesaid characteristics, by the operation and restoring of control switches according to different programs or sequences of operation thereof, as may be dictated by, or as may be a prerequisite of, the device to be energized or of an apparatus to be controlled by the device.

An amplifier or Transductor having the aforesaid mode of operation may be used to advantage in various arts.

In one particular art, namely the art of electrically controlled power operated presses, enormous simplification and improvement could be effected if the general principles of the conventional Transductor were applied thereto, inasmuch as electric power press controls as developed over the years, comprise a multiplicity of magnetic contactors and circuits; auxiliary contacts; interlocking electric circuits; maintaining circuits; etc., all deemed necessary today, largely for purposes of safety to the operators of the press, and to protect the press itself from damage due to faulty operation; and these complications could be obviated if a Transductor could be applied to control such presses; and it would seem that the application of a conventional Transductor to press controls would be a simple and obvious matter, since Transductors can deliver large current or small current and since the operation of the modern electric press control depends primarily on the reliable operation of a device in a work circuit that must be activated and restored respectively by current of high and low values.

But in attempting to substitute magnetic amplifier control for the present complicated magnetic contactor control of such presses as referred to, problems arise the solution of which is not obvious and has led to the present invention.

In order that the said problems may be fully understood, it is in order to outline briefly herein the features of electric press control.

A continuously running electric motor is connected to the press, to operate it, by a clutch; and the press is stopped by a brake. When one goes on, the other goes off, and vice versa, and this is effected by a fluid pressure cylinder and piston device. Fluid pressure, usually air pressure, is admitted to and exhausted from the cylinder by an electromagnetic valve device. The winding of the valve device is thus the work circuit device, of the premises, to be energized by suitably large current to operate it, and cut off or deenergized, or its energization reduced to a negligibly low value to restore it.

Operation of the valve causes the brake to release and the clutch to set to start the press, and restoring of the valve causes the clutch to release and the brake to set to stop the press.

Operator's control push buttons are provided in a plurality of pairs, a pair for both hands of each of a plurality of operators; and only when all of the pushbuttons are closed, can the magnetic contactors cause the valve winding to be energized and the valve operated;

and the push buttons are located remotely from the press to compel the operators to take up positions of safety.

The press operations are controlled cyclically by cam switches on the press main shaft.

These cam switches are timed to operate at certain points in the 360° complete cycle of the press, that is, a complete revolution of the press main shaft; and the operations of the cam switches are coordinated with the operations of the magnetic contactors by the push buttons, for purposes of safety to the operators.

To this end the push buttons must all be depressed to start the press, and all held depressed until the press has made about one half of its cycle. If any one is earlier released the press will stop. After the half cycle they can all be released and the press will start on the second half of its cycle. At the completion of the cycle, the press will stop.

If however the push buttons or any one of them has not been released the press will not start again and repeat the cycle, and cannot be started again on another cycle until all of the push buttons have first been fully released and all of them depressed again.

There are times in the use of a press having the foregoing features and under the control of operator's push buttons as described, when it is required that one or more of the push buttons be rendered inoperative so that the press can be operated by fewer men, or as an illustrative example, by one man.

The push buttons are made to have upper and lower contacts, the upper ones opening and the lower ones closing, when the push buttons are depressed as described, and the lower ones opening and the upper ones closing when the push buttons are released as described.

To render some of the push buttons inoperative as referred to, they are constructed so that their upper and lower contacts can be closed at the same time, and locked in that condition, a feature commonly referred to as "dummy plugging."

So long as any one push button is left in operation, the press can be operated by depressing and releasing it as described, and the features of the control effected thereby will be performed. But if by inadvertence all of the push buttons were rendered inoperative by dummy plugging, with their upper and lower contacts all closed, then, in the absence of countervailing provisions, the push button control would be lost, and the press would unexpectedly go on operating cycle after cycle, with liability of injury and damage; and special features must be made to avoid this.

As indicated in the foregoing, the invention hereof was made to solve the problem of adapting the general principles of magnetic amplifiers to a press control to energize the electromagnetic air valve thereof with ample current to positively operate it to start the press; and to deenergize it or reduce its energization to zero or substantially to zero, to restore it to stop the press; and to effect control of the amplifier in coordination with the usual operator's push button switches and cyclically operated cam switches; and to thereby effect a great simplification of the control and reduce its initial and maintenance costs, without sacrificing any of its said essential features; and a part of the invention resides in such a press control.

A part of the invention also resides in the aforesaid improved magnetic amplifier or Transductor itself, as a unit, by which said adaptation to press control is made possible, the unit having other uses, however, in the various arts, of which press control is but an illustrative example, and not being limited to its said use in a press control.

The invention is fully disclosed in the following description taken in connection with the accompanying drawing in which.

Figure 1:
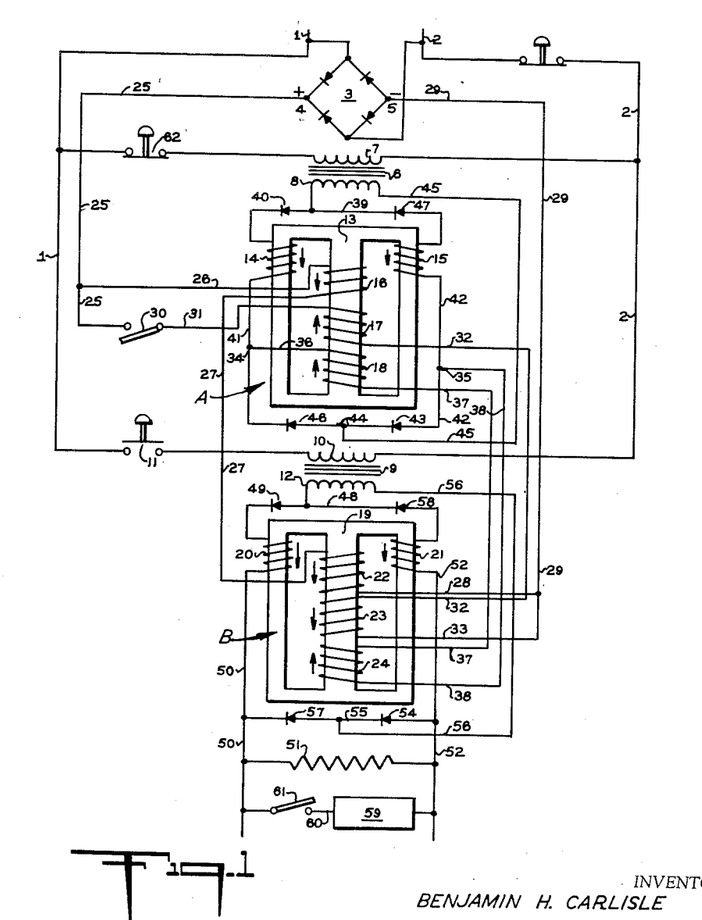
Fig. 1 is a diagrammatic view of a magnetic amplifier constituting part of the invention.

Referring to Fig. 1 of the drawing, illustrating a preferred form of the dual magnetic amplifier, referred to above as comprising part of the invention, a principle or first part is designated generally, at B, and an auxiliary or secondary part is designated at A.

At 1 and 2 are alternating current supply mains.

A full wave rectifier 3, connected across the mains 1—2, provides a source of unidirectional current, and has positive and negative potential points 4 and 5.

A transformer 6 has a primary 7 connected across the mains 1—2 through a control switch 62 shown closed, and has a "secondary" 8 associated with the part A.

A transformer 9 has a primary 10 connected across the mains 1—2 through a control switch 11 shown open, and has a secondary 12 associated with part B.

The amplifier part A comprises a three-leg core 13 having main reactor windings 14—15 on its outer legs and 3 control windings 16—17—18 on its middle leg, which will hereinafter be referred to respectively as biasing; initiating or anti-biasing; and sustaining windings.

The amplifier part B comprises a three-leg core 19 having main reactor windings 20—21 on its outer legs and three control windings 22—23—24 on its middle leg, which will hereinafter be referred to respectively as biasing, neutralizing and saturating windings.

The biasing windings 16 and 22 are permanently connected in series across the points 4 and 5 of the rectifier 3, the circuit comprising: wires 25—26, the winding 16, wire 27, the winding 22, wires 28 and 29.

The initiating winding 17 and neutralizing winding 23 are connected in series across the rectifier 3 through a control switch 30, shown open, the circuit comprising wire 25, the switch 30, wire 31, the winding 17, wire 32, the winding 23, wire 33, and the wire 29.

The sustaining winding 18 and saturating winding 24 are connected in series across points 34—35 of the amplifier part A from point 34; by wire 36, the winding 18, wire 37, the winding 24, wire 38, to point 35, to be explained later.

The main reactor winding 14 is in the following circuit. From secondary 8 to wire 39, through a rectifier 40, the winding 14, by wire 41, to point 34 thereon, through the windings 18 and 24 in series as described to the point 35 on a wire 42, and by the wire 42 below the point 35, a rectifier 43, wire 44 and wire 45 back to the secondary 8.

The main reactor winding 15 is in a similar circuit. From secondary 8, by wire 45 to wire 44, a rectifier 46, wire 41, to point 34, through the windings 18 and 24 in series to the point 35, by wire 42 above the point 35, winding 15, a rectifier 47, wire 39, back to secondary 8.

The main reactor winding 20 is in the following circuit. From secondary 12, to wire 48, through a rectifier 49, the winding 20, wire 50 which becomes one output main for the part B, through a load resistor 51, to wire 52, which becomes the other output main, a rectifier 54, wire 55, wire 56, back to the secondary 12.

The main reactor 21 has the following similar circuit. From secondary 12 by wire 56 to wire 55, through a rectifier 57, to wire 50, resistor 51, wire 52, winding 21, a rectifier 58 to wire 48 back to secondary 12.

All of said windings are wound so that their magneto motive forces respectively are in the directions of the arrows adjacent thereto.

The resistor 51 constitutes a preferably non-reactive auxiliary load of fixed ohmic value across the output mains 50 and 52 and is a part of the dual amplifier B—A and participates in its operation as will be referred to.

At 59 is a main load device which in practice is to be connected across the output mains 50 and 52 by a wire 60 through a switch 61 and, in view of the premises, this is the load or work device to which, in accordance, with corresponding values of potential on the output mains, unidirectional current is to be supplied having the aforesaid characteristics namely: zero or negligibly low value; abruptly raised to a maximum high value and sustained at that value; and abruptly reduced to said zero or negligibly low value.

From the foregoing, it will be understood by those skilled in the art, that in the amplifier part A, when control switch 62 is closed energizing the transformer 6, alternate half waves of alternating current from the transformer secondary 8, flow through the main windings 14 and 15 respectively; and all flow in the same direction from wire 41 through the windings 18 and 24 in series, to wire 42, and energize these windings with unidirectional current.

Also, that in the amplifier part B, when the control switch 11 is closed the transformer 9 will be energized, and half waves will similarly flow from wire 50 to wire 52 through the resistor 51 and produce unidirectional potential across the wires or output mains 50 and 52.

The mode of operation of Fig. 1 which will now be described relates to the development of said output potential on the mains 50 and 52 and to the control of its value at different times by the control switches 30, 11 and 62.

The biasing windings 16 and 22 are at all times fully energized.

In the amplifier part A, a part of the potential of the secondary 8 will appear across each of the main windings 14—15, due to the reactance of these windings, and part will appear across the points 34—35 on the wires 41—42 to which the windings 18 and 24 are connected; these windings acting as an output impedance load and the wires 41—42 acting as output mains of the amplifier part A, with unidirectional potential across them.

The effect of the constantly energized biasing winding 16, is to increase the reactance of the windings 14—15 so that the reactance potential thereacross will be so high and that across the mains 41—42 will in consequence be so low, that energization of the winding 18, which, as will be seen, is in the direction to produce saturation within the windings 14—15, will have negligible tendency to do so.

This effect of the biasing winding 16 to increase reactance of an amplifier reactor winding is, by itself, well known, the winding sometimes being designated as a "compensating" winding.

Those skilled in the art will know how to provide a biasing winding 16 of the necessary magneto motive force to have the aforesaid effect. Preferably the biasing winding is proportioned to increase the reactance of the windings 14—15 to the maximum practicable extent so that current flowing in the windings 14—15 and therefore in the windings 18 and 24 will be of negligibly low value.

If the control switch 30 is closed, the initiating winding 17 of part A is fully energized across the rectifier 3.

The initiating winding 17, being in the direction to increase the flux in the reactor windings 14—15, thereby reduces their reactance, and accordingly less of the applied potential appears across the windings 14—15 and more of it appears across the points 34—35 and the energization of the sustaining winding 18 is thereby raised. The combined effect of the windings 17 and 18 is to raise the flux within the windings 14—15 to or above the point on the saturation curve of the core at which saturation begins, and this reduces the reactance still more as is well known. The potential across the points 34—35 therefore rises still more and increases the energization of the winding 18 still more, and that increases the degree of saturation still more; and this action continues until the core is substantially fully saturated.

The reactance of the windings 14—15 is now at a negligibly low value, and the potential across the mains 41—42 is at the maximum, equal substantially to the input potential of the secondary 8.

If the control switch 30 were now opened, cutting off the initiating winding 17, the sustaining winding 18 alone would maintain saturation and sustain continuously the maximum potential across the points 34—35.

The saturating winding 24 of the amplifier part B is in series with the sustaining winding 18 of the part A, and is therefore energized from the potential across the points 34—35, and is wound so as to be able to substantially saturate the core of the part B when said potential is at the maximum and the winding 24 is fully energized.

The neutralizing winding 23 of part B in series with the initiating winding 17 of the part A, is as indicated, in opposition to the winding 24 of the part B; and is wound so that when the winding 24 is fully energized the winding 23 will neutralize the winding 24.

It will thus be seen that after the part A has been initially activated by closing the switch 30, the saturating winding 24 of the part B will be maintained fully energized and able to function as a saturating winding for the part B, due to the sustaining action of the sustaining winding 18 of the part A; and that the winding 24 will remain fully energized whether the switch 30 is closed or open, but its saturating effect will be neutralized by the winding 23 when the switch 30 is closed.

At the part B, it is assumed that the control switch 11 is closed.

The biasing winding 22 performs the same aforesaid function as the biasing winding 16 of the part A to increase the reactance of the main windings 20—21 and the potential thereacross to the maximum.

This causes very small current to flow through the load resistor 51 and very low potential to appear across the output mains 50 and 52.

If as described above, the control switch 30 of the part A is open, then at the part B, the neutralizing winding 23 will be de-energized and the saturating winding 24 will be fully energized and fully effective to produce saturation flux in the core and it will be saturated, and the reactance of the windings 20—21 will be reduced to a negligible value and large current will flow producing a high drop of potential in the resistor 51 and substantially the full potential of the secondary 12 will be impressed on the output mains 50 and 52.

With the control switch 11 closed as was assumed, if the control switch 30 were also closed, the winding 23 would destroy the saturation produced by the winding 24 as described, and the output potential on the mains 50 and 52 would return again to said very low potential.

If the control switch 11 be opened, power input to the part B will be thereby cut off, and the potential of the mains 50 and 52 will fall to zero, regardless of whether the control switch 30 is open or closed.

From the foregoing it will be seen that with the control switch 11 open, the potential on the output mains will always be at zero value; and that with the control switch 11 closed, the said output potential will be at a high or maximum value when the control switch 30 is open, and will fall to a very low value when the control switch 30 is closed.

Thus, the successive high and low values for purposes of the premises, can be obtained by leaving the control switch 30 open, and closing and opening the control switch 11; or by leaving the control switch 11 closed, and opening and closing the control switch 30; and that the output potential will fall to a very low value, when both the control switches 11 and 30 are closed.

In some instances it may be required to change the output potential of the mains 50 and 52 from high to low, by only momentarily operating and restoring the control switches. For such cases the control switch 62 is placed in series with the transformer primary 7 of the part A.

Assuming that the switches 11 and 62 are closed, momentarily closing and opening the control switch 30, will first, upon closing, energize the winding 17 initiating the build up of saturation and establishing the sustaining action of the winding 18, and energizing the winding 24, and producing high output potential on the output mains 50 and 52 and then will maintain it after the switch 30 is opened.

Then momentarily opening and closing the control switch 62 will interrupt the sustaining action of the winding 18 and de-energize the winding 24, and the output potential of the mains 50 and 52 will fall to a low value.

The aforesaid high and low potentials of the output mains will be impressed on the work device 59 upon closing switch 61 and it will therefore be supplied with current having the prescribed aforesaid characteristics.

Certain advantages of the amplifier of the invention appear more clearly when it is compared with a conventional amplifier of the same Transductor class; which conventional Transductor may be defined as one having main inductor windings, which because of reactance normally supply a low output, and a control winding to saturate their cores when a high output is wanted.

The amplifier herein described is adapted to momentary operation of the control switches, which in many instances is a pre-requisite. To energize the saturating winding of the conventional amplifier, a control switch must be closed and maintained closed as long as high output is wanted, or, a relay would have to be provided, operated by momentary closure of a control switch and maintaining itself closed thereafter, and this would introduce objectionable moving parts as referred to.

The saturating winding of the conventional amplifier must be energized with D. C. preferably obtained from a rectifier, and the rectifier must supply all of the current to the winding and the winding must be of large size to produce the saturation; both of which because of size add to the original cost.

The saturating windings, here the sustaining windings 18 and 24, likewise are small and inexpensive because they are energized by unidirectional current derived directly from the A. C. supply mains at high voltage.

The output potential of the present amplifier is in effect, the IR potential of an auxiliary load resistor 51; and high output potential is produced by large current in the resistor. This high current flows through the main inductor windings and aids in saturating them. Whereby the saturating windings may be made still smaller and cheaper as having less to do to produce saturation.

A biasing winding is provided to effect low output and has no control switch to energize and deenergize it but is permanently energized, and therefore always ready to restore the main windings to high reactance and low output, automatically, and is not subject to being de-energized except upon failure of the main supply.

The rise of current in the work device in the load circuit to said high value, and its fall to the low value, and vice versa, is, as described herein, abrupt, as distinguished from a gradual rise or fall. When the necessarily large control winding heretofore employed is energized to saturate the core and deenergized to allow the saturation to decay, the inductance of such a control winding delays the change of flux and the said high and low values are arrived at gradually and not abruptly.

The biasing winding is rendered effective to perform its function, and rendered ineffective to do so, as described, by the momentary operation and restoring of control switches which also perform other functions, and not by opening and closing its own circuit; and the control of its action therefore does not depend upon the operation of control switches provided especially and additionally for it, the operation of which would have to be timed to coordinate its action with other actions in the amplifier, if the amplifier is to change its output from low to high and vice versa, abruptly, which is one of its important functions.

Figure 2:
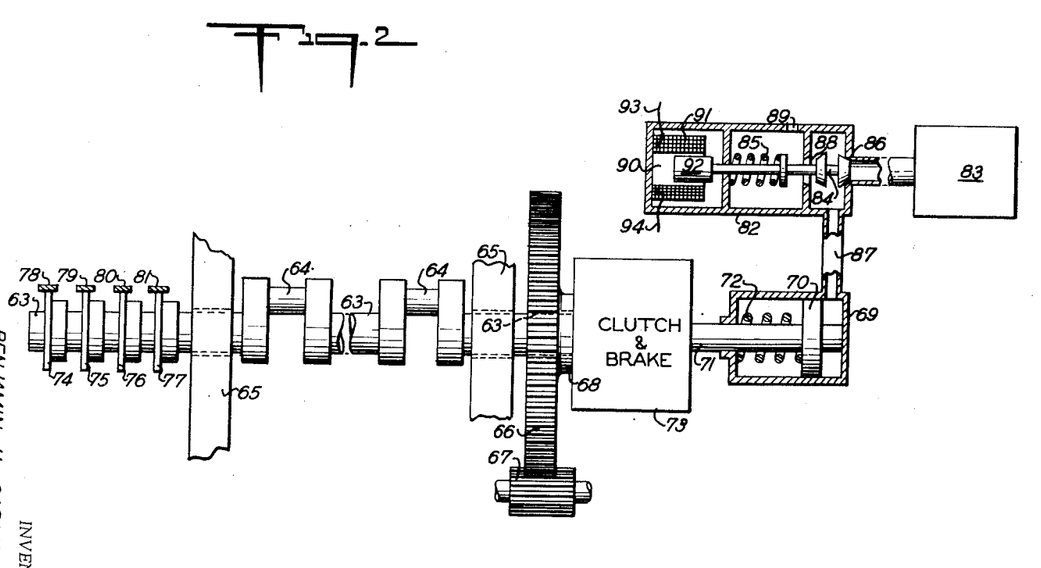
Fig. 2 is a fragmentary view of a part of a power press, and a simplified showing of an electromagnetic valve device therefor, to control a clutch and brake thereof.

Coming now to the application of the invention to a press control, as referred to, reference may first be made to Fig. 2 which illustrates part of a press mechanism.

The main shaft 63 of the press is provided with cranks 64 to reciprocate the press head, in a well known manner, and is rotatably supported in bearings on the main frame 65; and has a gear 66 with a hub 68, normally rotated idly on the shaft by a motor pinion 67.

A pneumatic cylinder 69 supported on the main frame of the press has a piston 70 therein with a piston rod 71 projecting therefrom. The piston is normally retracted by a spring 72.

The gear hub 68 and piston rod 71 project into a brake and clutch mechanism indicated diagrammatically at 73. The mechanism comprises elements by which when the piston 70 is retracted by the spring 72, a brake grips the shaft 63 and stops the press; and by which when the piston rod is projected forwardly, by fluid pressure behind it, the brake is released and the hub 68 is connected to the shaft 63 by a clutch, to cause the gear to drive the shaft and press; the clutch being released when the piston rod 71 is retracted.

A more complete showing of such a mechanism may be found in the patent to Colbert 2,133,161, October 11, 1938.

On the free end of the press shaft 63 are mounted cams 74 to 77 that rotate with the shaft and operate cam switches 78 to 81, to open and close them; and the cams are adjustable around the shaft to cause them to operate the switches at selected points in the press cycle.

A valve housing 82, communicates with a source 83, of air pressure; and has a valve element 84 reciprocable to a normal position by a spring 85 to close an inlet port 86, to cut off the air pressure supply from a conduit 87, leading to the cylinder 69; and to open an exhaust port 88 which connects the cylinder conduit 87 to an exhaust 89; and the valve element 84 is reciprocable in the other direction by an electromagnet 90 having a winding 91, and a plunger 92 connected to the valve element 84.

When the magnet winding 91 is energized to a sufficiently high value, the plunger 92 overpowers the spring 85 and moves the valve element 84 to close the exhaust port 88 and open the inlet port 86; and air pressure from the source 83 then flows through the conduit 87 into the cylinder 69 behind the piston 70, and the piston is projected forwardly against the opposition of the spring 72, and the piston rod 71, projected forwardly with it, operates the clutch and brake mechanism 73 to release the brake and set the clutch to drive the press.

When the magnet winding 91 ie de-energized or energized to a negligibly low value, the valve spring 85 moves the valve element 84 to the position shown at which it closes the inlet port 86 and opens the port 88 and exhausts the cylinder 69 through the conduit 87, port 88 and exhaust outlet 89; and the cylinder spring 72 then retracts the piston 70 and rod 71 to the position shown, and thereby the spring sets the brake and releases the clutch, and stops the press.

The magnet winding 91 has an energizing circuit represented in Fig. 2 by wires 93—94.

Figures 3, 4:
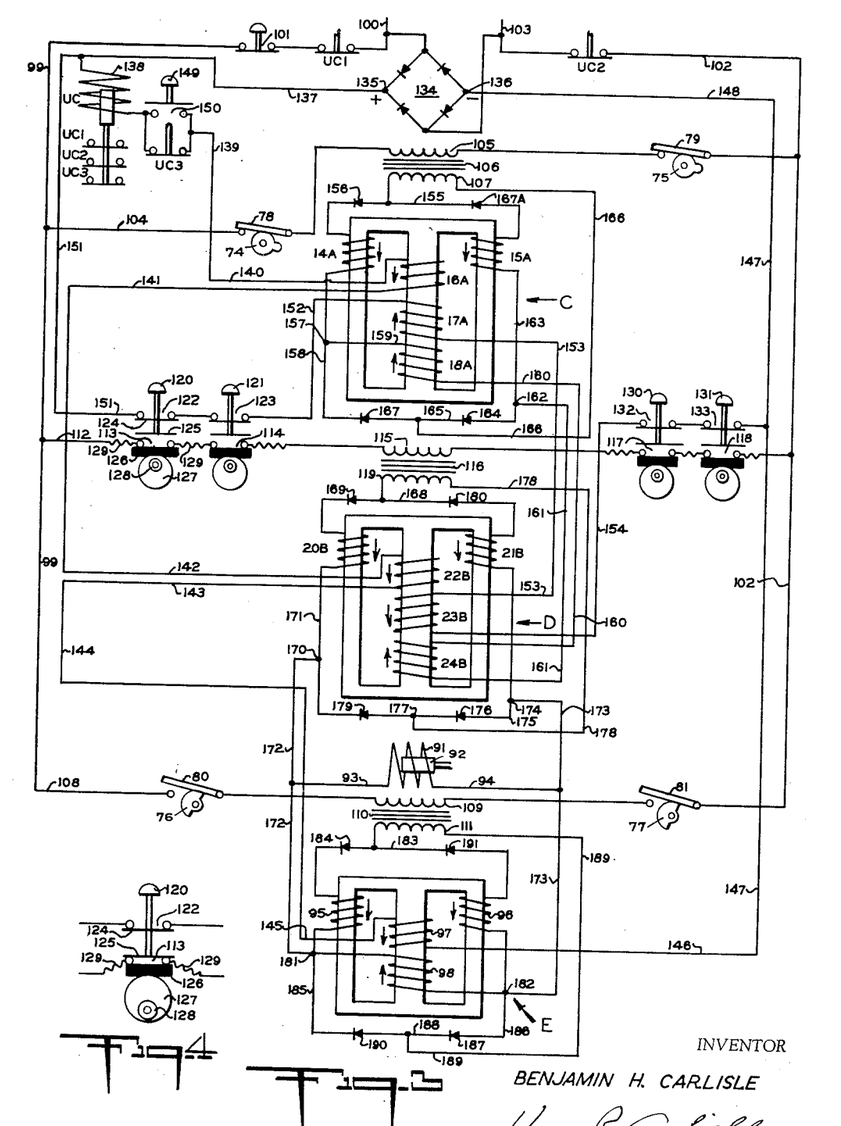
Fig. 3 is a diagrammatic view of a complete control for a power press including the valve device of Fig. 2; and the amplifier of Fig. 1; and constituting part of the invention.
Fig. 4 is a fragmentary view of a push button device of Fig. 3 with parts thereof in different positions.

In Fig. 3 which will now be described and which illustrates the application of the improved amplifier above described to a press control, the cam operated switches 78, 79, 80, 81, usually referred to as limit switches, and the corresponding cams 74, 75, 76, 77 are reproduced from Fig. 2 with the same reference characters, to identify them.

The air valve operating electromagnetic device of Fig. 2 is also indicated as being reproduced in Fig. 3, by the winding 91 and plunger 92, and by the energizing circuit therefor, comprising the wires 93 and 94; these parts having the same reference characters as in Fig. 2.

In Fig. 3 is an amplifier in two parts, C and D, substantially like the parts A and B of the amplifier of Fig. 1; and also a third amplifier E.

The amplifier part C has main windings, 14A and 15A; a biasing winding 16A; and initiating winding 17A; and a sustaining winding 18A; the suffix A indicating that the components of the amplifier part C are substantially the same as those of the part A of Fig. 1.

The amplifier part D has main windings 20B and 21B; a biasing winding 22B; a neutralizing winding 23B; and a saturating winding 24B; the suffix B indicating that the components of amplifier part D are substantially the same as those of the part B of Fig. 1.

By using these designations the description can be simplified.

The amplifier E has main windings 95—96; a biasing winding 97; and a sustaining winding 98.

All of the aforesaid windings are poled to develop magnetomotive forces in the directions of the arrows adjacent thereto.

Fig. 3 is an across-the-line type of diagram and comprises a side line 99 connected to one A. C. supply line 100 through closed contacts 101 of a manual switch and closed contacts UC1 of a relay to be described; and has the other side line 102 connected to the other A. C. supply line 103 through closed relay contacts UC2.

A cross line 104 between the side lines 99 and 102, has therein, in series, the primary 105 of a transformer 106, and the cam switches 78—79 reproduced from Fig. 2 and normally closed; the transformer having a secondary 107 associated with the amplifier part C.

A cross line 108 has therein, in series, the primary 109 of a transformer 110, and the cam switches 80—81 reproduced from Fig. 2 and normally open; the transformer having a secondary 111 associated with the amplifier E.

A cross line 112 has, in series therein, normally open contacts 113—114, the primary 115 of a transformer 116, and normally open contacts 117—118; the transformer having a secondary 119 associated with the amplifier part D.

The normally open contacts 113—114, constitute the lower contacts of a pair of push-button type switches, 120—121, having also upper contacts 122—123 which are normally closed.

The push button switches 120—121 are constructed so that, when depressed, a bridge 124 thereof opens the upper contacts 122—123 and a bridge 125 thereof closes the lower contacts 113—114; and vice versa, when the switches are released. The construction also provides means by which both the upper and lower contacts 122 and 113 or the upper and lower contacts 123 and 114 may be closed and held closed or even locked closed, concurrently.

The actual construction of this feature is not a part of the present invention, and is in fact known commercially, and is therefore shown only diagrammatically.

This feature for only one switch, say the switch 120, need be described.

A block of insulation 126 is disposed under the lower contacts 113, and a circular eccentric cam is rotatably mounted under the block with a knob 128 for manually rotating it.

Upon rotating the cam 127 through 180°, by the knob 128, the cam raises the block 126 and the contacts 113 move upwardly with it into engagement with the bridge 125, and the bridge 124 moves upwardly into contact with the contacts 122 (if it is not already in contact therewith).

The circuit connections with the contacts 113 may have flexible portions 129—129 to facilitate their movement; and Fig. 4 shows the switch 120 after the foregoing operation.

The push button switch 121 is constructed and may be operated the same as the switch 120.

The aforesaid normally open contacts 117—118 in the cross line 112, are the lower normally closed contacts of another pair of push button switches 130—131, having normally closed upper contacts 132—133; and the switches 130—131 are constructed and may be operated the same as the switches 120—121.

A full wave rectifier 134 is connected across the A. C. supply mains 100 and 103, to provide a source of D. C. at positive and negative output points 135—136.

The biasing windings 16A, 22B and 97 are to be always energized by D. C. and to this end are connected across the points 135—136 of the rectifier 134, as follows: from the point 135, by wire 137, through the winding 138 and an under-current relay UC through closed relay contacts UC3 wires 139—140, the winding 16A, wires 141—142, the winding 22B, wires 143—144—145, the winding 97, wires 146, 147, 148, to the rectifier point 136.

It is intended that, to energize the biasing windings by this circuit, a push button 149 must first be operated and complete the said circuit through its contacts 150, whereupon current will flow in the circuit and operate the relay UC by its winding 138. The relay will close its contacts UC1, UC2, UC3, and the contacts UC3 will close and take over energization of the circuit, and make a maintaining circuit for the relay to hold it operated, and the push button switch 149 is then intended to be released and open its contacts 150.

The winding 138 of the relay UC, is proportioned so that the relay will remain operated only so long as the biasing windings in series with it are fully energized. If the energization of the biasing windings should, due to any cause, become reduced, or should fail entirely, the relay UC would thereupon be immediately restored and open its contacts. The contacts UC1 and UC2 are reproduced in the system in the line of supply of the A. C. as described so as to cut it off if they should open; with the result of de-energizing the air valve magnet 91 and stopping the press.

Again, the biasing windings are energized with D. C. as described. If however one of the main windings 14A and 15A; or 20B and 21B; or 95—96; the current in which is pulsating unidirectional current as will become more apparent, should develop a fault and become unbalanced, a low frequency potential would be generated thereby in the biasing winding circuit, causing the energization of the winding 138 of the relay UC to have successive low values; and the winding as described being sensitive to less than a predetermined energization, would then cause the relay to restore on one of said low values and open its contacts with the described result of cutting of the main current supply.

The biasing windings function in some respects as protective windings as will appear and it is for this reason that the relay UC is provided.

The initiating winding 17A and the neutralizing winding 23B are connected to be energized with D. C. and in series, from the rectifiers 134 by a circuit comprising: wires 137 and 151, the upper normally closed contacts 122 and 123 of push button switches 120 and 121; by wire 152, the winding 17A, wire 153, the winding 23B, wire 154, the upper normally closed contacts 132—133 of push button switches 130—131, wires 147—148 back to the rectifier 134.

The circuits of other windings will be described as the general description proceeds.

The amplifier parts C and D, are shown in what may be called a normal or stand-by condition preparatory to starting the press and at the beginning of its 360° cycle.

The cam switches 78—79 are timed to be closed at the start of the cycle and to remain closed through the cycle except for a momentary opening and closing thereof near the end of the cycle.

Half waves of current from the secondary 107 flow to wire 155, through a rectifier 156, through main winding 14A to a point 157 on a wire 158, by wire 159, through sustaining winding 18A, by wire 160, saturating winding 24B, wire 161 to point 162 on a wire 163, rectifier 164, wire 165, wire 166 back to the secondary 107.

The alternate half waves from secondary 107 flow by wire 166, to wire 165, a rectifier 167, to point 157, windings 18A and 24B in series as before, and by wire 161 to point 162, wire 163, winding 15A, a rectifier 167A, wire 155, back to secondary 107.

From the description of Fig. 1 it will be clear that the potential from the point 157 to the point 162 will be unidirectional potential of a high or maximum value; that the windings 23B and 24B neutralize each other; that if the initiating winding 17A and neutralizing winding 23B were de-energized, the high potential across points 157 and 162 of the part C, would be sustained by the sustaining winding 18A, and the saturating winding 24B would saturate the core of the part D.

The press is now ready to be started and the operators depress all of the push buttons 120—121 and 130—131, opening their upper contacts 122—123 and 132—133, de-energizing windings 17A and 23B, and closer lower contacts 113—114 and 117—118, leaving the saturating winding 24B fully energized and not neutralized.

The lower contacts are in the energizing circuit of the amplifier part D and energize the secondary 119.

Half waves of current then flow from secondary 119 to wire 168, through a rectifier 169, through main winding 20B to output point 170 on main 171, by wire 172 to valve winding 91 by wires 93—94, by wire 173, to point 174 on wire 175, through a rectifier 176, to wire 177, by wire 178, back to the secondary; and the alternate half waves flow from the secondary 119 by wire 178 to wire 177 through a rectifier 179 to point 170, and by wires 172, 93, 94, through the valve winding 91, and by wire 173 to point 174, and thence upwardly in wire 175 through winding 21B, through rectifier 180, to wire 168, and back to the secondary 119.

The core of amplifier part D being saturated by winding 24B as described, the potential across points 170 and 174 is at a high or maximum value and the valve winding 91 is energized thereby and operated to start the press as described.

At the same time, the high potential across points 170 and 174 of the part D is impressed upon the saturating winding 98 of the amplifier E, by wire 172 to point 181, through the winding 98 to point 182, and by wire 173, to point 174 and saturates the core of amplifier E.

Amplifier E is inactive at this time because its energizing circuit energizing the secondary 111 is open at the cam switches 80—81. The cam switches 80—81 are timed to be open at the start of the cycle, and to close at about one half of the cycle of the press, and to open again at the end of the cycle.

The push button switches 120—121 and 130—131 are supposed to be held depressed for about one half of the cycle, for safety purposes referred to. If any one or more of them is released prematurely, creating a danger condition as described, the energizing circuit to the amplifier part D would be cut off at the lower contacts 113—114 and 117—118 of the push buttons 120—121 and the potential across points 170 and 174 would disappear and the energization of the valve winding 91 would fall to zero and the press would stop.

After the press has run about half of the cycle but before it is safe to release the push buttons, the cam switches 80—81 will have closed the energizing circuit for transformer 110.

Thereupon half waves of current from secondary 111 will flow to wire 183, through a rectifier 184, through main winding 95, to pont 181 on wire 185, thence through sustaining winding 98, to point 182 on wire 186, through a rectifier 187, to wire 188, to wire 189, back to the secondary; and the alternate half waves from the secondary 111 will flow therefrom by wire 189 to wire 188, through a rectifier 190, to point 181, through sustaining winding 98, to point 182, and upward in wire 186, through main winding 96, and a rectifier 191, to wire 183, and back to the secondary 111.

Due to saturation by the winding 98, high unidirectional potential appears across the ponts 181—182. This potential maintains full energization of the winding 98 which sustains the saturation thereby and sustains the high potential at the points 181—182.

This high potential is also impressed upon the valve winding 91 by the wires 172 and 173 connecting the points 181—182 to the wires 93—94.

The valve winding 91 is therefore for a while, energized by high potential from both the part D and the amplifier E, jointly.

The push buttons 120—121 and 130—131 may now be released; and the opening of their lower contacts opens the transformer energizing circuit of the part D and the potential across its points 170 and 174 disappears, and the valve winding 91 is then energized by the amplifier E alone, by the potential across its points 181—182.

When the press has completed its cycle, the cam switches 80—81 open as referred to and the amplifier E is de-energized thereby as described, and the potential across its points 181—182 disappears and the valve winding 91 is de-energized and the press stops.

The foregoing operations effect normal operation of the press, due to normal operation of the push buttons 120—121 and 130—131.

If however, and abnormally, the push buttons are not released, then nevertheless the press will be stopped at the end of the cycle upon opening of the cam switches 80—81, by the following provision.

As mentioned, the cam switches 78—79 are timed to open momentarily and then close at a point in advance of the end of the cycle.

When they open, they open the energizing circuit of the amplifier part C, and thereby the potential across its points 157 and 162 disappears. This interrupts energization of the sustaining winding 18A and terminates its sustaining action, and interrupts energization of the saturating winding 24B of the amplifier part D, and the potential across points 170 and 174 falls to a very low value, due to the high reactance of the main windings 20B and 21B, made maximum by the biasing winding 22B.

When the cam switches 78—79 again close after their momentary opening, and again close the energizing circuit of the amplifier part C, the potential across its points 157 and 162 will be at a very low value due to the high reactance of the main windings 14A and 15A made maximum by the biasing winding 16A; and this low potential, impressed on the windings 18A and 24B, is too low to produce saturation by these windings, whereby the potentials across points 157 and 162, and 170 and 174 remain at very low values; the latter being too low to maintain the valve operated by its windings 91, so that when the cam switches 80—81 open, the valve restores and stops the press.

As referred to, the press cannot again be started, unless all of the push buttons are released; and then all depressed again.

As described, it is essential that the upper contacts 122—123 and 132—133 of all of the push buttons be closed, to condition the control to start the press. Therefore if the push buttons are, abnormally, held depressed, the press cannot be started again until all of the push buttons have been released.

The development of high potential across the points 157 and 162, 170 and 174, and 181—182 is described as resulting from saturation by the windings 18A, 24B and 98 respectively.

To further explain this it should be added, that saturation in each instance reduces the reactance of the corresponding main windings to a negligible value, and therefore only a very small portion of the impressed or transformer input potential appears across the main windings. In consequence of the reduced reactance, current flows determined in value by the impedance of a load in the circuit of the main windings, connected across said points, and the drop of potential in the load and across the points is substantially equal to the input potential and is the said high potential at said points.

In the amplifier part C, the load is the windings 18A and 24B in series, connected across the points 157 and 162; in the part D the load is the valve winding 91 and the winding 98 of amplifier E connected across the points 170 and 174; and in the amplifier E the load is the winding 98 and the valve winding 91 connected across the points 181—182.

The description comes now to the aforesaid so called "dummy plugging" feature of the invention, the purpose of which is to permit one or more of the push button switches to be temporarily locked out or conditioned so that it need not be operated in the control of the press, and whereby full control as described can be had by less than all, or in an extreme case by only one; and to prevent abnormal operation if by inadvertence all of them are locked out.

The upper contacts 120—121 and 130—131 being all in series, locking any of them closed, will obviously not interfere with the opening and closing of the others to perform their functions of operating the press and the same is true of the lower contacts 113—114 and 117—118.

Means has been described in connection with Figs. 3 and 4 for optionally locking the upper contacts closed; and at the same time locking the lower contacts closed.

In general, the control will start the press when the lower contacts are all closed, after it has been conditioned for starting by closing all of the upper contacts.

In the absence of countervailing provisions, it would appear that if by inadvertence, all of the upper contacts and all of the lower contacts were locked closed, the press would start and run continuously, and be out of control. This however is prevented as follows.

Closing of all of the lower contacts of the push buttons, energizes the amplifier part D and it will impress high potential on the valve winding 91 from points 170 and 174, to start the press, provided that the winding 24B is producing core saturation.

Closing of all of the upper contacts of the push buttons produces saturation in the amplifier part C, and it will energize the winding 24B from points 157 and 162, sufficiently to produce saturation, but at the same time closing of the upper contacts energizes the winding 23B from the D. C. supply sufficiently to neutralize the winding 24B and prevent it from producing saturation.

Thus, upon inadvertently locking all of the push buttons, the press will remain at rest in safe condition.

In Fig. 3 only two pairs of push buttons 120—121 and 130—131 have been shown, contemplating operation by only two operators. Any desired number of operators may attend the press and operate the control and be subject to the aforesaid safety features, by providing a corresponding number of pairs of push button switches and contacts, identical with those illustrated, and with their upper contacts all connected in series and their lower contacts all connected in series, in the same sense as the upper and lower contacts of those shown, and it is believed that this will be understood without further description.

The operation of the press may be stopped at any time, by opening the contacts of the stop switch 101.

This operation of the press, with all of the features of control deemed necessary in electrical press control, is effected by the amplifier system of Fig. 3; and the simplification over prior systems referred to hereinbefore, by eliminating electromagnetic contactors, may be seen by reference to Fig. 4 of patent to Colbert 2,133,161, October 11, 1938 which illustrates a press control of the latter type many of which are in successful operation.

The form of the magnetic cores illustrated for the amplifier of Fig. 1 and the three amplifiers C, D and E of Fig. 3, is not essential and has been chosen to simplify the drawing. Other forms of core heretofore utilized in magnetic amplifiers, with the windings thereon suitably disposed, may be used, as will be understood by those skilled in the art.

For safety purposes and for preventing abnormal press operation when the principal control windings fail for any reason to perform their function as expected, it is desirable for all of the biasing windings 16A, 22B and 97, to be at all times energized. This is done by connecting them in series, so that if one fails, all will fail; and upon failure of any one, the relay UC is provided to restore and open its contacts UC1 and UC2 and cut off power at the alternating current mains, which, obviously, will restore the valve device 91 and stop the press.

Some of these functions of the biasing windings are explained below.

When the push buttons 120—121 and 130—131 are depressed, to close contacts 113—114 and 117—118 and energize the amplifier part D, it is expected that the part C will have high output at the points 157 and 162 and that thereby the winding 18A of part C and winding 24B of part D will have high potential thereon and cause high output to be developed at the points 170 and 174 of part D to energize the device winding 91 and start the press.

If due to some failure of function of winding 18A of part C, this does not occur, then the biasing winding 16A of part C performing its function of increasing the reactance of the main windings 14A and 15A will cause the output at points 157 and 162 to be negligibly low, which in turn will cause the output at points 170 and 174 of part D to be negligibly low; or if the failure of function is that of windings 24B of part D, biasing winding 22B of part D will cause the output of part D delivered to the device winding 91 to be negligibly low for a like reason; and in either case the press will be prevented from starting under such abnormal conditions.

Again, if the functions of the windings of parts C and D are performed normally and the press starts, but the function of winding 98 of part E fails, then when the part E is energized by closure of the cam switches 80—81, the biasing winding 97 will cause the output of part E to be negligibly low, and insufficient to take over energization of the valve winding 91 to keep the press running as described and it will stop when the push buttons are released.

Again, if the winding 18A of part C is performing normally, and the winding 98 of part E is capable of performing normally, but the winding 24B of part D for any reason does not perform normally and produce the required potential at the output points 170 and 174 to fully energize the winding 98 of part E, then the biasing winding 97 of part E will prevent the part E from developing sufficient output potential to take over energization of the valve winding 91 and the press will not continue to run after the push buttons have been released, and the press will stop.

Subject matter illustrated and described herein but not claimed is being claimed in my copending patent application Serial No. 441,703 filed July 7, 1954, Division 26.

I claim:

1. In a control system a first and a second magnetic amplifier each of the type comprising A. C. input circuit means energizing the amplifiers, D. C. control winding and circuit means, rectifiers, and unidirectional potential output mains; a work circuit having an operable and restorable electric device therein; the work circuit connected to the output mains of the second amplifier; the control winding and circuit means comprising respective saturation sustaining windings on the first and second amplifiers, connected in series across the unidirectional output mains of the first amplifier; and comprising an initiating winding on the first amplifier poled to assist the sustaining winding thereof and a neutralizing winding on the second amplifier poled to oppose the sustaining winding thereof; the initiating winding and neutralizing winding connected in series across a D. C. source through a control switch; whereby closure of the control switch energizes the initiating winding and thereby causes both saturating sustaining windings to become sufficiently energized to produce and sustain saturation but that of the second amplifier neutralized by the neutralizing winding, thereby causing the output mains of the second amplifier to subject the work circuit and device to low potential to restore the device if operated; and whereby opening of the control switch deenergizes the neutralizing winding of the second amplifier thereby causing the second amplifier to be saturated by its sustaining winding and causing its output mains to subject the work circuit and device to high potential to operate the device.

2. The control system described in claim 1 and in which the second amplifier is energized from A. C. mains through an A. C. control switch, and upon opening the switch the second amplifier responds to subject the work circuit and device to low potential to restore the device if operated.

3. In a control system for a cyclically operating machine of the type comprising an electromagnetic device, and apparatus controlled by energization and deenergization of the device to start and stop the machine; a source of D. C. and a source of A. C.; mechanical switch means operated by the machine at predetermined points in its cycle; a plurality of serially connected operator switches comprising each normally closed and normally open contacts and operable and restorable at will; rectifying magnetic amplifier means arranged to receive energization from the A. C. source, and having control winding means arranged to receive energization from the D. C. source under control of the operator switches; the amplifier means having output circuit means connected to the device; the amplifier means comprising a control circuit through the normally closed contacts, and constructed to respond to operation of the operator switches and opening said circuit, and to deliver unidirectional output current to the device, to start the machine, and to respond to operation of the mechanical switch means at an intermediate point in the machine cycle, to continue said delivery of unidirectional current to the device after restoring of the operator switches, and to respond to operation of the mechanical switch means at the end of the cycle to discontinue delivery of said unidirectional current to the device to stop the machine; optionally operable means for locking closed all of the contacts of some of said operator switches to cause the machine starting response to occur upon opening of said circuit by operation of the remainder whereby unwanted starting of the machine cannot occur if all of the operator switches are inadvertently locked.

4. In a control system, a first, second and third magnetic amplifier, each of the type comprising: A. C. input circuit means to energize the amplifier, D. C. control winding and circuit means, rectifiers, and unidirectional potential output mains; a work circuit having an operable and restorable device therein; the output mains of the second amplifier being connected to the work circuit; connections connecting the output mains of the third amplifier to the work circuit; control winding and circuit means of the first amplifier circuit means being in series with control windings and circuit means of the second amplifier; and controlling the potential of the output mains of the second amplifier; operator switch means comprising contacts controlling the winding and circuit means of the first amplifier and causing the output potential of the second amplifier mains to be low when the contacts are closed and high when they are open; a timed switch timed to operate after opening of the operator switch contacts and closing the energizing circuit means of the third amplifier to cause its output mains to also apply device operating potential to the work circuit through said connection; the operator switch contacts upon being closed causing interruption of the application of potential from the second amplifier to the work circuit; the timed switch timed to restore after a time interval following closing of the operator switch contacts and causing cessation of application of potential of the third amplifier to the work circuit, to restore the device.

5. The control system of claim 4 and in which the operator switch means comprises a plurality of operator switches having respective normally closed contacts all in series relation; and lock means is provided to optionally lock less than all of the contacts in closed condition; whereby operation of the device may be effected upon opening of the remaining operator switches contacts, and unwanted operation of the device is prevented upon inadvertent locking of all of the switch contacts closed.

6. An electric device in a work circuit normally in restored condition; and an electric controller for applying potential to the work circuit to energize the device to operate it, and for terminating the application of the potential to the circuit to deenergize the device to cause it to restore; a power operated cyclically operating machine comprising means responding to operation of the device to apply power to the machine to start its cycle, and responding to restoring of the device to stop the machine at the end of the cycle; the controller comprising a first and a second and a third magnetic amplifier; each amplifier having electric input winding means and control winding means and potential output mains; a plurality of operator switches operable and restorable at will; a machine switch timed to be operated by the machine at an intremediate point in the machine cycle; energizing circuit means for the winding means, controlled by the operator switches and machine switch; the winding means and circuit means of the first and second amplifiers arranged to respond to operation of the operator switches to cause the first amplifier to supply output energization to the control winding means of the second amplifier to cause the second amplifier to supply device operating output potential to the work circuit to operate the device; the winding and circuit means of the third amplifier arranged to cause it to respond to operation of the machine switch at the intermediate point in its cycle to also supply output potential to the work device; the second amplifier being responsive to restoring of the operator switches to discontinue said supply of potential; the third amplifier being responsive to restoring of the machine switch at the end of the cycle to discontinue said supply of potential to the work device to cause it to restore and stop the machine.

7. In a control system, a first, second and third magnetic amplifier each comprising rectifiers, and main winding means to be energized with alternating supply potential, and output mains; and comprsing control winding means to be energized with unidirectional potential in a manner to cause the output mains to have unidirectional output potential thereon; an operable and restorable electric load device; the output mains of the second and third amplifiers being connected to the load device; an operator switch having normally closed contacts; a pair of opposed control windings on the second amplifier; a first one energized by the output mains of the first amplifier; the second one energized through the closed contacts of the operator switch and, upon operation of the operator switch to open its contacts, the second amplifier responding to the first winding and supplying potential of operating value to the load device; a timed switch timed to operate after the operator switch has been operated and closing a circuit to energize the main winding means of the third amplifier with alternating supply potential; means energizing the control winding means of the third amplifier in a manner to cause it to develop unidirectional potential on a work device connected thereto to maintain it operated after subsequent restoring of the operator switch; and the timed switch being timed to restore and interrupt energization of the said main winding means of the third amplifier after a time interval to cause the load device to then restore.

References Cited in the file of this patent
UNITED STATES PATENTS 2,648,813   Bradley ---------------- Aug. 11, 1953